(12) United States Patent
Schneider et al.

(10) Patent No.: US 6,584,775 B1
(45) Date of Patent: Jul. 1, 2003

(54) CONTROL OF PRIMARY MEASURES FOR REDUCING THE FORMATION OF THERMAL NITROGEN OXIDES IN GAS TURBINES

(75) Inventors: Anton Schneider, Wettingen (CH); Klaus Morgenthaler, Rupperswil (CH); Moritz Burkard, Birr (CH); Rolf Dittmann, Nussbaumen (CH)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/665,056

(22) Filed: Sep. 19, 2000

(30) Foreign Application Priority Data

Sep. 20, 1999 (DE) .......................................... 199 44 922

(51) Int. Cl.[7] .............................................. F02C 9/00
(52) U.S. Cl. .......................................... 60/775; 60/776
(58) Field of Search ............................. 60/39.05, 39.06, 60/39.55, 747, 775, 776

(56) References Cited

U.S. PATENT DOCUMENTS

| | | | | |
|---|---|---|---|---|
| 4,259,837 A | * | 4/1981 | Russell et al. | ............. 60/39.55 |
| 4,529,887 A | | 7/1985 | Johnson | |
| 4,733,527 A | | 3/1988 | Kidd | |
| 5,361,576 A | | 11/1994 | Müller | |
| 5,402,634 A | * | 4/1995 | Marshall | ..................... 60/39.06 |
| 5,704,205 A | | 1/1998 | Hepner et al. | |
| 5,896,736 A | | 4/1999 | Rajamani | |
| 5,937,634 A | | 8/1999 | Etheridge et al. | |
| 6,122,916 A | * | 9/2000 | Amos et al. | ................... 60/748 |

FOREIGN PATENT DOCUMENTS

| | | |
|---|---|---|
| DE | 24 16 909 | 10/1975 |
| EP | 0 321 809 | 6/1989 |
| EP | 0427952 | 5/1991 |
| EP | 0509496 | 10/1992 |
| EP | 0691511 | 1/1996 |

OTHER PUBLICATIONS

Siglas–Lambda, Siemens AG, Sales Glass, Innovative Solutions for the 21st Century, (1 pg).
Wheelabrator Air Pollution Control, Inc., De–Nox SCR Flue Gas Denitrification Selective Catalytic Reduction. (2 pp.).
Colonco Power Engineering, Thermal Energy Plants. (3 pp.).
NOx–Minderung Durch Primaer–und Sekundaermassnahmen bei Kraftwerken (ABB Technik 5/92) (pp. 31–37).
J. Geldermann et al, The Reference Installation Approach for the techno–economic assessment of emission abatement options and the determination of BAT accordng to the IPPC–Directive, University of Karlsruhe (TH), (2 pp.).
J. Cofala et al, Nitrogen oxides emissions, abatement technologies and related costs for Europe in the RAINS model database, IIASA, Interim Report IR–98–88/Oct., (4 pp.).

* cited by examiner

Primary Examiner—Louis J. Casaregola
(74) Attorney, Agent, or Firm—Adam J. Cermax

(57) ABSTRACT

A method of controlling primary measures for reducing the thermal nitrogen oxide formation in gas turbines, the primary measures being controlled according to a characteristic which characterizes an air-quantity-specific heat release rate in a combustion chamber of the gas turbine. In order to approximately determine the heat release rate, the power output available at an output-side end of a useful-power shaft of the gas turbine is used, and the air quantity is determined as a function of the ambient conditions. The useful power is preferably determined from the electric terminal power output of a generator driven by the gas turbine, and the electric terminal power output is advantageously corrected with a term which takes into account the combustion-chamber pressure. Furthermore, when the air quantity is being determined, if need be the position of an adjustable preliminary guide row is also taken into account.

16 Claims, 4 Drawing Sheets

CONTROL OF PRIMARY MEASURES FOR REDUCING THE FORMATION OF THERMAL NITROGEN OXIDES IN GAS TURBINES

FIELD OF THE INVENTION

The present invention relates to a method of controlling primary measures for reducing the formation of thermal nitrogen oxides in gas turbines, the primary measures being controlled according to a characteristic which characterizes an air-quantity-specific heat release rate in a combustion chamber of a gas turbine. In particular, it relates to a method of controlling the fuel distribution to burners or burner groups of a gas turbine and of controlling the quantity of steam or water introduced into the combustion chamber of a gas turbine for reducing the nitrogen oxides.

BACKGROUND OF THE INVENTION

Premix burners with which a very low pollutant burden, in particular a very low nitrogen-oxide burden, of the exhaust gas can be realized by lean premixed combustion without further measures, have been disclosed previously, for example by EP 0 321 809.

Burners of the type of construction as specified in the abovementioned publication have proved successful in gas turbines in practice in large quantities.

The burners referred to react in a very sensitive manner to changes in the stoichiometry of an individual burner: if a burner is operated with a rich mixture, the emissions increase exponentially. In the case of an operation on a lean fuel mixture, the flame rapidly becomes unstable. In fact, these burners in modern gas turbines are already operated very close to their stability or extinction limit. However, the overall stoichiometry of a gas turbine varies within wide limits over the entire operating range.

Gas turbines are therefore equipped with a multiplicity of burners whose fuel feed can be controlled individually or in groups. Thus, in the case of variable stoichiometry of the entire machine, the stoichiometry of the burners is kept within the operating limits. The nitrogen-oxide emissions are used as a measure of the burner stoichiometry, this measure manifesting itself externally, and although these nitrogen-oxide emissions may well be dependent on a number of other factors, they nonetheless provide a good indication of the flame temperatures, and ultimately also constitute a variable which can be kept below a limit value precisely by means of the burner technology described.

There are essentially two ways of keeping the burners at a reliable stoichiometric interval when the machine stoichiometry varies greatly overall. In one variant, the feed line of each burner is provided with a shut-off member. In the part-load range of the gas turbine, only some of these shut-off members are opened, and only some of the burners are operated. When the load is increased, more fuel is fed, which means a hotter flame when the air quantity stays the same. A point is reached at which the operation of a further burner is possible or—on account of exceeding admissible emissions—is necessary. The entire fuel quantity is distributed to a larger number of burners by opening the shut-off member in the fuel feed line of a further burner, and thus each individual burner is operated on a leaner mixture again, that is, with a cooler flame and lower nitrogen-oxide emissions.

A further method consists in combining a plurality of burners in groups in each case. Thus a number of burners may be combined in two groups, of which the first comprises, for example, five or three times as many burners as the second. All the burners of each of these groups are connected to a common fuel line, in which a control member is arranged in each case. Within the lowermost load range, that is to say at the smallest fuel quantities, the first burner group is in operation, and the control member of the second burner group is completely closed. If need be, the flame stability is additionally assisted by a number of diffusion burners. With increasing fuel quantity, the diffusion burners may be shut down. With increasing fuel quantity, the burners of the first burner group are operated with an increasingly richer mixture. The control member in the fuel line of the second burner group is then successively opened, and some of the fuel is directed to the burners of the second group.

The introduction of inert media, preferably water or steam, into the flame or the flames in the interior of a gas-turbine combustion chamber offers a further possibility of reducing the formation of nitrogen oxides. In this case, the water or steam quantity is controlled as a function of a control variable in such a way that it has a certain ratio to the fuel quantity, this ratio being predetermined as a function of the control variable.

Irrespective of how the control of the fuel distribution or of the water and steam injection is executed, an appropriate variable has to be used for controlling the fuel distribution or the water and steam injection. Control, for example with the aid of measured emission data, proves to be problematic in transient operating states. The use of emission measurements with the requisite high accuracy and reliability over a long period also requires regular competent maintenance. A machine characteristic is thus used in practice as a parameter for controlling the fuel distribution. In test series, a suitable profile of the fuel supply is determined as a function of this variable and programmed in the control of the machine. The burner control therefore reacts directly to changes in the control parameter.

Such a parameter must reproduce the fuel/air ratio or the air-mass-specific heat release rate of the machine as accurately as possible, if need be weighted with some other variables which contain the flame stability and the formation of nitrogen oxides.

A control parameter with which it is appropriate to begin is the relative power output of a gas turbine, which on the one hand takes into account the power output of the gas turbine and on the other hand also takes into account changes in the air quantity on the basis of variable ambient conditions. However, it has been found that the relative load to a much greater extent represents a process variable rather than a combustion variable. On account of a multiplicity of factors, a change in the ambient temperature in particular is overcompensated for. Furthermore, in machines which have adjustable guide rows at the compressor inlet, the air quantity depends to a great extent on the position in particular of a preliminary guide row. Precisely in combined-cycle plants, however, this preliminary guide row is adjusted as a function of certain process temperatures. The position of the preliminary guide row and thus the air quantity of the combustion may therefore vary considerably at one and the same relative load at different ambient temperatures.

With the demands for efficiency and environmental compatability, which of necessity are to be made on the energy supply of the future, the reliable operating range within which the burners ensure compliance with the emission regulations at an adequate distance from the operating limit will become increasingly narrow, and such tolerances may become less and less acceptable. The statement that the operating range which is predetermined by statutory, technical and economic limits will be rapidly restricted also applies to other primary measures which are taken in order to reduce the formation of thermal nitrogen oxides.

SUMMARY OF THE INVENTION

An object of the invention is to provide a method of controlling primary measures for reducing the formation of thermal nitrogen oxides in gas turbines, the primary measures being controlled according to a characteristic which characterizes an air-quantity-specific heat release rate in a combustion chamber of the gas turbine. When this variable is being formed, recourse is to be had to data which are available in a reliable manner and where possible without a time delay.

According to the invention, this is achieved in that, in order to approximately determine the heat release rate, the power output available at an output-side end of a useful-power shaft of the gas turbine is used, and the air quantity is determined as a function of ambient conditions and machine operating data. In the case of the ambient conditions, in particular the compressor inlet temperature and the ambient air pressure, which determine the density of the air drawn in by the compressor, are to be taken into account. In addition, the air humidity may also be important. As far as the machine operating data are concerned, consideration is to be given first of all to the position of adjustable compressor guide rows and especially to an adjustable preliminary guide row, which factors influence the volumetric intake flow of a compressor to a very high degree.

With regard to the primary measures for reducing the formation of thermal nitrogen oxides, consideration in this context is to be primarily given to the distribution of the fuel quantity to different premix burners or groups of premix burners, or to the control of the quantity of inert media, for example steam or water, which is injected into a combustion chamber in order to reduce the flame temperature. In addition, a number of further methods for reducing the formation of thermal nitrogen oxides are of course also conceivable, which methods can be controlled by means of the method according to the invention.

Furthermore, it is advantageous to take into account the change in the air mass flow as a function of the position of the compressor guide rows, in particular of the preliminary guide row. It is also appropriate to correct the characteristic thus determined with a term which includes the pressure ratio of the gas turbine. Such a term must on the one hand take into account the fact that the ideal process efficiency increases with increasing pressure ratio, thus the ratio of the generator power output and the heat release rate in the combustion chamber changes. A further point which is advantageously taken into account by such a term is the change in the component efficiencies, in particular in the compressor efficiency, at a different pressure ratio. The compressor final temperature, which likewise depends on the pressure ratio to a great extent, influences the formation of nitrogen oxides as well as the flame stability. Likewise, the distribution of cooling air and combustion air also changes with the pressure ratio within certain limits. On account of the complex relationships, the pressure-dependent correction term is to be determined partly empirically or is to be adapted to the specific conditions of a machine.

In order to be able to utilize the characteristic in a practical manner, it is not necessary to determine this in a quantitatively exact manner. On the contrary, it is sufficient, starting from a certain reference point, to correctly reproduce the relative changes as a function of the machine data and ambient data cited.

It is of course also easily possible to use the characteristic thus determined to control the water or steam injection into the combustion chamber of a gas turbine as described briefly above.

DESCRIPTION OF THE DRAWINGS

Preferred embodiments of the invention are described herein and illustrated in the accompanying drawings in which:

FIG. 1 schematically shows a gas turbine 1 for driving a generator 2. Air is drawn in and compressed by a compressor 11. In the combustion chamber 12, fuel is fed to the compressed air via a fuel line 4 and burned there. Hot gas under pressure is expanded in the turbine, 13 while performing work. The gas turbine is equipped with an adjustable preliminary guide row 14, which determines the inflow conditions to the compressor and thus the drawn-in air quantity. To control the power output of the gas turbine, the fuel quantity supplied is controlled via the fuel-control member 41. A line 5, via which a quantity of an inert medium, for example steam or water, which is to be set by a control member 51, is introduced into the combustion zone of the combustion chamber 12, is provided in order to reduce the formation of thermal nitrogen oxides in the combustion chamber 12.

Figure 1:
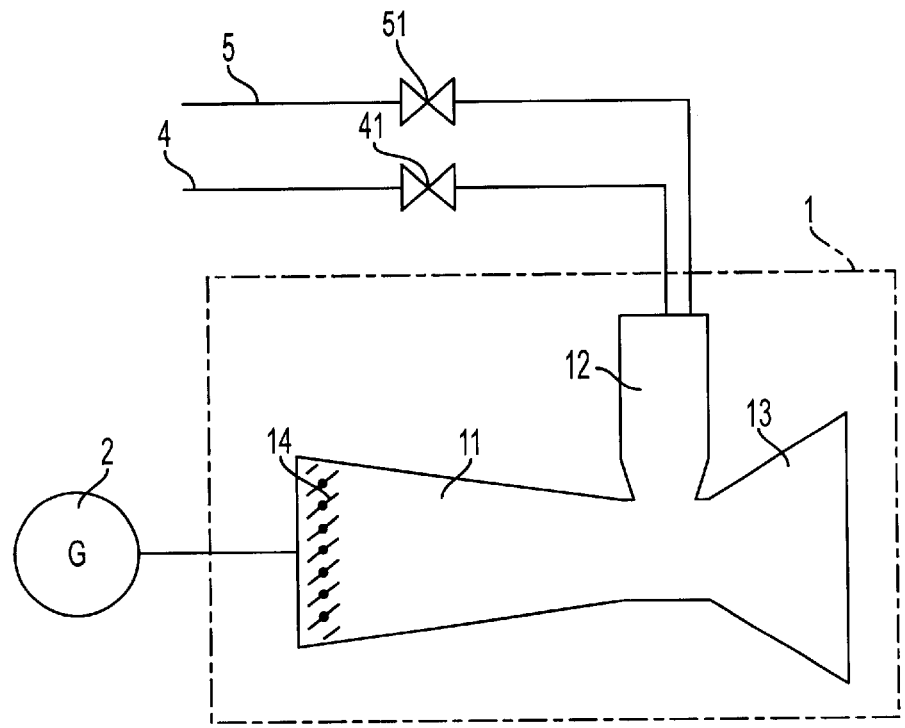
FIG. 1 shows a schematic representation of a gas turbine with water or steam injection for reducing the formation of thermal nitrogen oxides.
Figure 2:
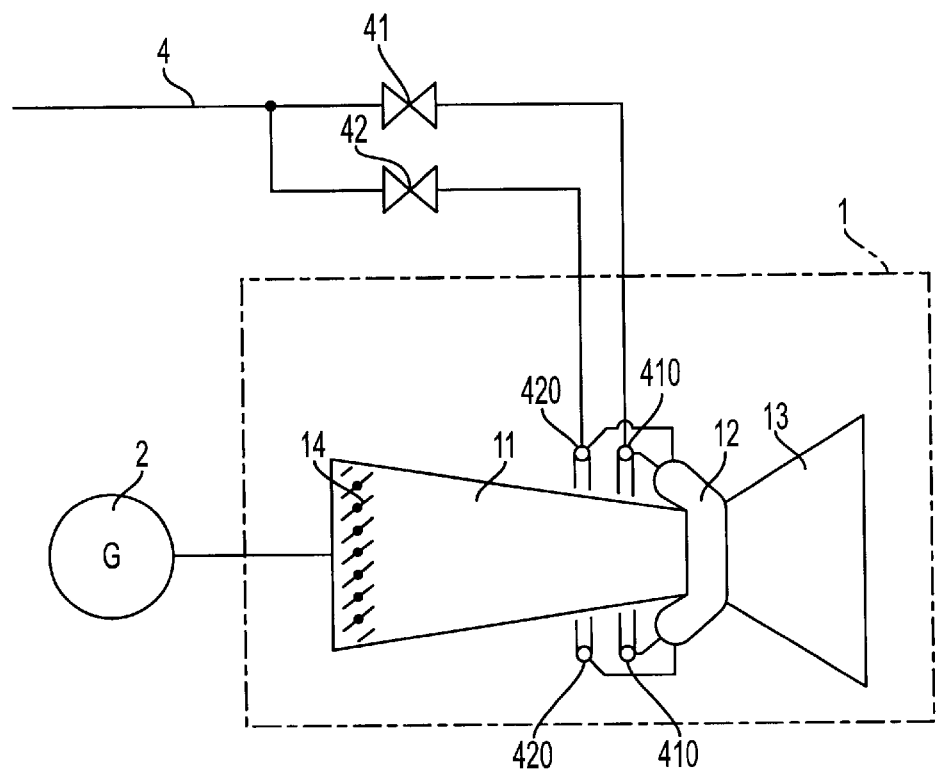
FIG. 2 shows a schematic representation of a gas turbine with an annular combustion chamber and two groups of premix burners for reducing the formation of thermal nitrogen oxides in accordance with the invention.

A further embodiment of a gas turbine having measures for reducing the formation of thermal nitrogen oxides is shown in FIG. 2. This gas turbine differs from that shown in FIG. 1, in particular in the construction of the combustion chamber 12 and the fuel supply. The combustion chamber 12 is designed as an annular combustion chamber, which is provided with a plurality of premix burners. The premix burners are subdivided into two groups, which are supplied with fuel from two ring lines 410 and 420. The ring lines are connected to a common fuel line 4. Provided in the feed line to each of the ring lines 410 and 420 is a separate fuel-control member 41, 42, via which control members 41 and 42 the distribution of the fuel quantity to the two burner groups can be changed.

Figure 3:
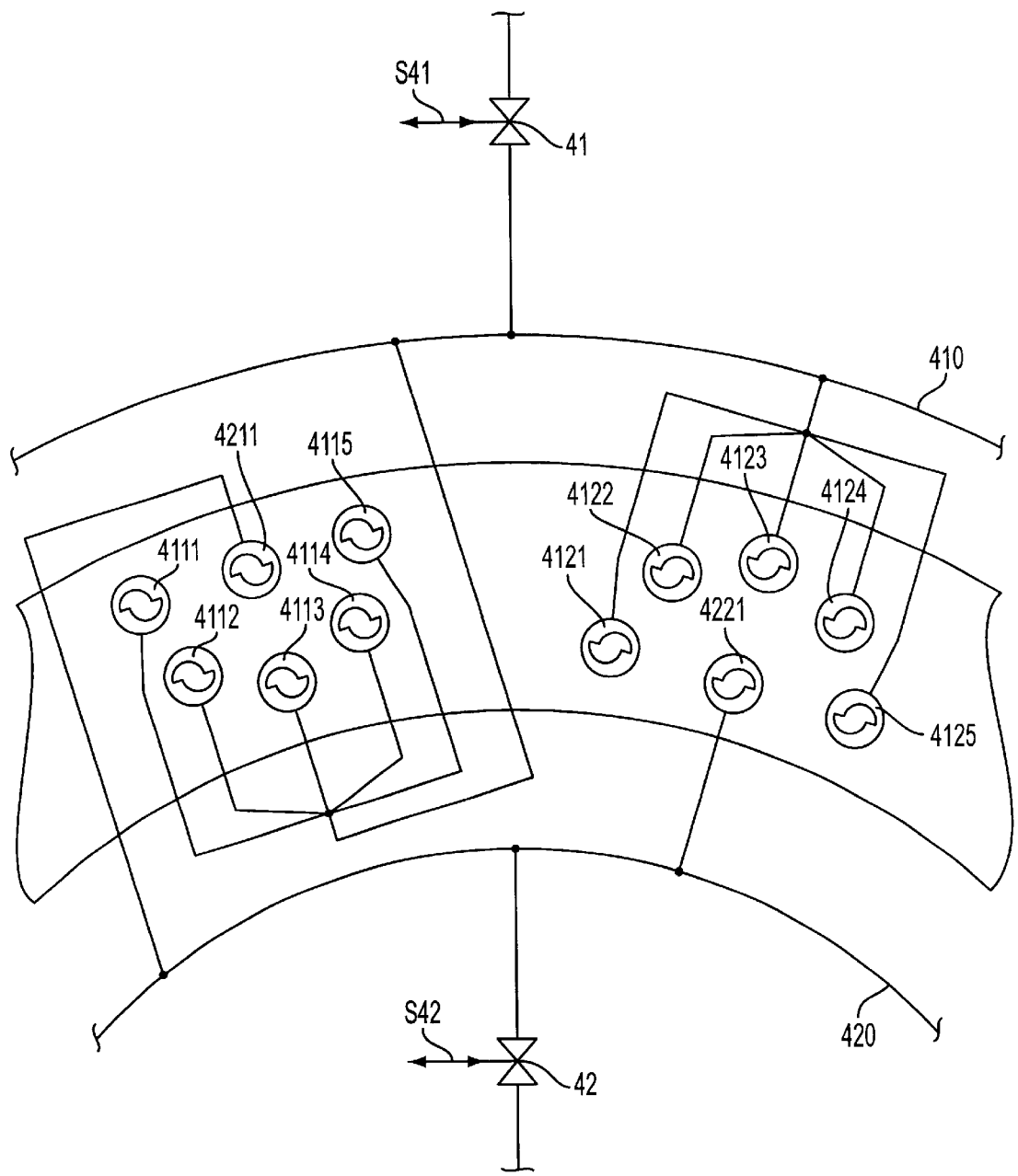
FIG. 3 shows a detail of an annular combustion chamber of a gas turbine, which is equipped with premix burners, and the associated fuel supply including the members for controlling the fuel distribution to various burner groups.

A circumferential segment of the front end of an annular combustion chamber from FIG. 2 having a plurality of premix burners 4111–4115, 4121–4125, 4211 and 4221 is shown in FIG. 3. The premix burners are combined with the fuel supply in the groups 41xx and 42xx, which in each case have a fuel supply to be controlled independently of one another. Thus all the burners 41xx are connected to a ring line 410, which is connected to the main fuel supply via the control member 41. In a similar manner, all the burners 42xx are connected to the ring line 420, which is supplied with fuel via a control member 42. Such a configuration is known from the premix burners of the gas turbine ABB GT13E2. In such a gas turbine, fuel is burned at very low machine stoichiometry via a number of diffusion burners (not shown) in order to achieve stable combustion. With increasing load, the opening S41 of the control member 41 is enlarged, and the burners 41xx can be operated on a very lean mixture, that is to say, with cold premix flames, which are not yet stable taken by themselves, since the combustion is assisted by the diffusion burners. If the power output is sufficiently high in order to obtain stable premix flames at all the burners 41xx with the fuel quantity supplied, the fuel supply of the diffusion burners is shut off and the entire thermal power transformation is taken over by the premix burners 41xx. From this point on, the burner arrangement shown can be operated in two ways. Thus, on the one hand, the control member 41 could take over the control of the load, and the opening S42 of the control member 42 could be preset as a function of a control parameter. On the other hand, the fuel-supply lines could be connected to a common main control valve (not shown) which takes over the control of the power output, while a certain opening ratio S42/S41 is preset for the control members 41, 42 as a function of the control, parameter. In the embodiment of the invention, the first-mentioned mode of operation is taken as a basis below; from this, the realization of the invention for the second mode of operation will readily. present itself to the person skilled in the art. In this way, over a wide range of the machine stoichiometry, the stoichiometric ratios of the burners are kept within a range within which a stable flame with low nitrogen oxide formation is ensured. Of course., in principle, an inert medium for the further reduction of the formation of thermal nitrogen oxides may also be introduced here.

Figure 4:
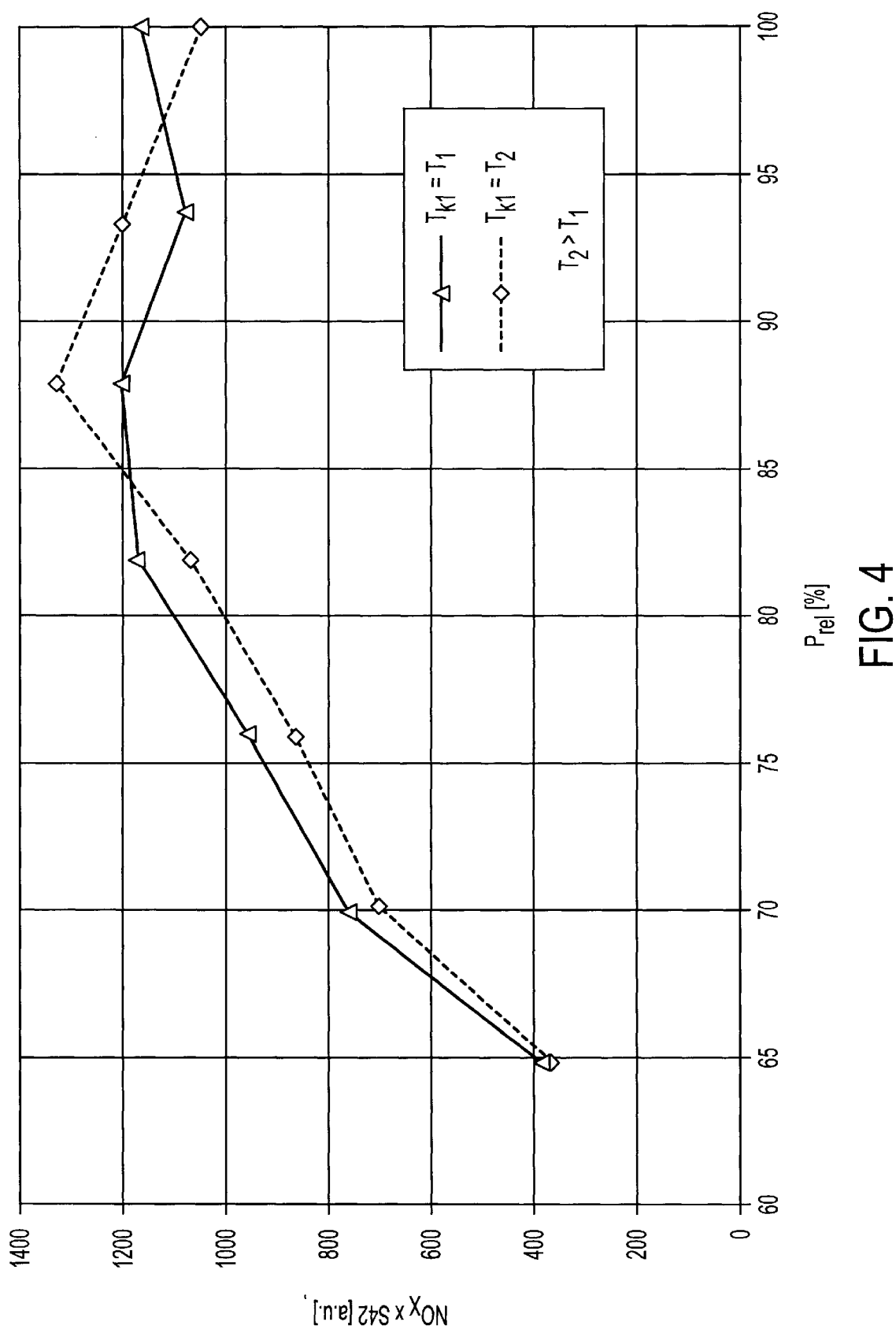
FIG. 4 shows nitrogen oxide measured values of such a machine, which have been recorded at different ambient temperatures, plotted against the relative power output of the machine.

Measured values of the nitrogen oxide emissions of a gas turbine of type ABB GT 13E2 actually constructed are plotted against the relative gas-turbine power output in FIG. 4. As mentioned, these emissions decrease with decreasing flame temperature at the burners 41xx, that is, at otherwise identical boundary conditions, with an increasing opening S42 of the control member 42. In order to ensure better comparability of the emissions, the emissions were weighted in a multiplicative manner with the opening S42 of the control member 42 and plotted in the vertical direction on the diagram. The units shown are selected at random, since the variable S42 may be specified in any desired units. The numerical values shown of the weighted emissions are therefore absolute values of little informative value, but ensure excellent comparability of the measured values with one another, since the emissions have undergone a correction for different values of S42. The relative gas-turbine power output is plotted on the horizontal axis.

Furthermore, the results of two series of measurements which were recorded at different compressor inlet temperatures are plotted. The differences are immediately apparent. Within a load range up to about 85% relative gas-turbine load, the emissions at low ambient temperature are higher than at the higher ambient temperature. On the other hand, this behavior is reversed between 85% load and full load. This phenomenon may be attributed to the control of the preliminary guide row position of the compressor, this control primarily determining the volumetric flow—and thus under given ambient conditions the mass flow—of the air in the gas-turbine process. This is because the task of the well-known preliminary guide row control, on the one hand, is to regulate the exhaust-gas temperature to a certain temperature which is favorable, for example, for a heat-recovery steam generator. On the other hand, the combustion temperature must be limited by an increase in the air quantity to an upper limit value. Within the low power range within which the exhaust-gas temperature is controlled, a higher ambient temperature therefore means a larger air quantity, and thus leaner combustion, and finally lower nitrogen oxide emissions at high outside temperatures. On the other hand, however, a lower ambient temperature at an identical relative power output means a larger absolute power output, thus a larger pressure gradient across the turbine, and thus a higher hot-gas temperature at an identical exhaust-gas temperature. Therefore the point at which the preliminary guide row has to direct large air quantities into the machine to limit the hot-gas temperature is reached sooner, and at an identical relative load the preliminary guide row in this control state is opened wider, which results in a leaner mixture, which can in turn be recognized in lower nitrogen oxide emissions, at low outside temperatures.

It can therefore be concluded from the diagram in FIG. 4 that, if S42 is controlled according to the relative load, combustion conditions, as expressed by the nitrogen oxide emissions, vary under different ambient conditions. In the case of the hitherto conventional emission limit values and the modern premix burner technology cited, however, it was possible to always set the operating concepts of the burners in such a way that a sufficient distance from the extinction limit is ensured on the one hand, but that the adherence to the emission limit values is also ensured on the other hand.

However, this available corridor is becoming narrower and narrower on account of tomorrow's energy supply requirements. Even if the range of stable combustion is extended by consistent development of the burners, it is nonetheless desirable to have other concepts available for the control of the combustion parameters, these concepts reacting in a less sensitive manner to changes in the ambient conditions. As already mentioned above several times, the statements made here also apply in a similar manner to other measures which, for reducing the formation of thermal nitrogen oxides, influence the combustion process and attempt to reduce temperature peaks, such as, for example, the injection of water and/or steam into the flame or flames in a gas-turbine combustion chamber.

Nonetheless, the air quantity of the gas turbine, at least its relative change with the preliminary guide row position and the ambient conditions, can be readily described, so that the air quantity can be used as an absolute value, or also as a relative value to a reference point, as a variable in the control of the control-member opening S42. On the other hand, the determination of the thermal power output turns out to be more complicated, since, for example, the accuracy of the fuel-quantity measurement depends on a multiplicity of influencing variables. Furthermore, changes in the fuel composition and thus in the calorific value are not detected by a fuel-quantity measurement. On the other hand, the terminal power output Pact of a generator driven by the gas turbine is available with high accuracy and reliability. According to the invention, this terminal power output is corrected with a term which in particular takes into account the thermal efficiency of the ideal open gas-turbine process, this thermal efficiency being given by $$\eta = 1 - \Pi^{\frac{1-\kappa}{\kappa}}$$

where, in this equation, $\Pi$ represents the pressure ratio of the gas-turbine process and $\kappa$ represents the ratio of the specific heat values of the working medium.

According to the invention, therefore, the weighted nitrogen oxide emissions shown in FIG. 2, instead of being represented via the relative gas-turbine power output, are represented in a next step via a variable which is called SPRR (Specific Power Release Rate) below. SPRR is calculated as $$SPRR = \frac{P_{act}}{m_{air}} / (1 - \Pi^A)$$

where $P_{act}$ represents the shaft power output of the gas turbine, in the simplest case reproduced by the terminal power output of the generator, $m_{air}$ is the air mass flow which flows into the compressor at a given preliminary guide row position and under given ambient conditions, $\Pi$ is the ratio of combustion-chamber pressure to ambient pressure, and A is an exponent to be determined partly empirically.

To determine the exponent A, weighted emission values are measured at various shaft power outputs of the gas turbine for at least two different ambient temperatures. First of all it is assumed that $A=(1-\kappa)/\kappa$, which, when determining the SPRR, corresponds to a simple conversion of the shaft power output into a thermal power transformation while assuming an ideal open efficiency. However, practice shows that, with the combustion-chamber pressure—and the air mass flow!—the component efficiencies also change dramatically. A further important point is the variation in the compressor final temperature and thus in the combustion-air temperature, which likewise has an effect on the possible reliable operating range of the burners and the formation of nitrogen oxides. The exponent A is changed in an iterative manner until the weighted emissions measured at different temperatures coincide as well as possible when plotted against the characteristic SPRR.

Figure 5:
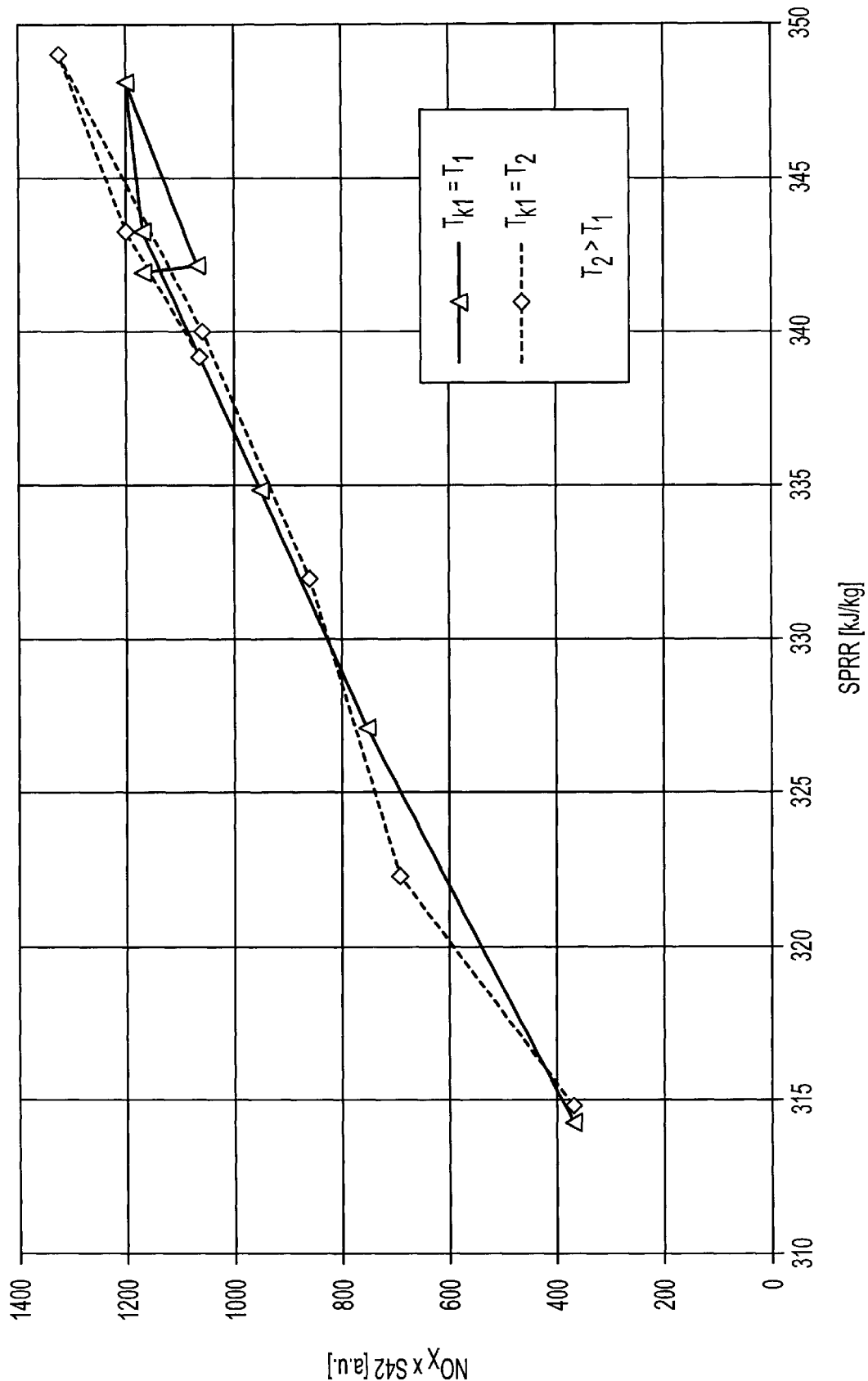
FIG. 5 shows the same measured values as in FIG. 4 plotted against the control variable according to the invention.

In the example shown here, A=1 actually leads to a good result. In the diagram in FIG. 5, the weighted nitrogen oxide emissions which are shown in FIG. 4 as a function of the relative power output of the gas turbine are plotted against the variable SPRR, in which case A=1 has been selected when forming SPRR.

When the invention is being implemented, series of measurements at two different ambient temperatures are therefore to be completed preferably in a first step. In combined-cycle plants which have a device for preheating the intake air or a steam-heated anti-icing system in the intake duct, this may of course be carried out in an especially simple manner by a test run being carried out with and without preheating of the intake air. The weighted nitrogen oxide emissions determined during these test runs are then plotted against SPRR, and the exponent A is successively varied in order to obtain as good a conformity as possible between the values of the two test runs. In a further run, an opening S42 of the control member 42 adapted for the desired emission values can then be determined in the manner known per se as a function of the variable SPRR. However, since S42 is henceforth not controlled as a function of the relative load but as a function of SPRR, changes in the air quantity, as caused, for example, by the preliminary guide row, are taken into account. Therefore the nitrogen oxide emissions no longer depend on ambient conditions to the extent shown. This in turn means that, when setting the combustion, a smaller distance from the extinction limit than hitherto necessary for ensuring the requisite operating reliability can be maintained.

The weighting of the nitrogen oxide emissions may additionally be described in broad outline. Depending on the method which is used to reduce the nitrogen oxide emissions, a parameter variation may be carried out at a fixed gas-turbine power output. Thus, in the control shown in the exemplary embodiment, the opening of the control member 42 can be varied. In another concept, for example, the ratio of the control-member openings S42/S41 is varied, in the case of individual burner control the number of burners in operation is varied, or in the case of water or steam injection the ratio of the injected water or steam quantity to the fuel quantity is varied. This enumeration of course lays no claim to completeness and is not intended to restrict the scope of protection claimed. A well-defined functional relationship is then obtained between the measured nitrogen oxide emissions and the varied parameter. A standardization or weighting factor may then be determined from this functional relationship, so that is possible to form a combination of the measured nitrogen oxide emissions and the value of the varied parameter, which is precisely not a function of this parameter.

From the exemplary embodiment, the procedure for establishing the burner operating points, for example, in a gas turbine with individual burner control will be obvious to the person skilled in the art. Likewise, the person skilled in the art will also easily learn how to use the method according to the invention for controlling a water quantity or steam quantity which is injected into the combustion chamber of a gas turbine in order to minimize the nitrogen oxides.

| List of designations | |
|---|---|
| 1 | Gas turbine |
| 2 | Generator |
| 4 | Fuel line |
| 5 | Line for feeding an inert medium |
| 11 | Compressor |
| 12 | Combustion chamber |
| 13 | Turbine |
| 14 | Adjustable preliminary guide row |
| 41 | Fuel-control member |
| 42 | Fuel-control member |
| 51 | Fuel-control member for the inert medium |
| 410 | Fuel line which is fed via the control member 41 |
| 420 | Fuel line which is fed via the control member 42 |
| 41xx | Group of premix burners which are connected from the line 410 |
| 42xx | Group of premix burners which are connected from the line 420 |

What is claimed is:

1. A method of controlling primary measures for reducing the formation of thermal nitrogen oxides in the combustion process in a gas turbine, the method comprising:
   determining a relative air mass flow rate through the gas turbine as related to a reference air mass flow rate at a reference ambient air temperature, ambient air pressure, ambient air humidity, inlet guide van position, and compressor inlet temperature, as a function of at least one of actual ambient air temperature, ambient air pressure, ambient air humidity, inlet guide vane position, and compressor inlet temperature;
   determining relative shaft power output as related to a reference shaft power output at an output shaft of said gas turbine;
   determining a heat release rate as a function of said relative shaft power output;
   calculating a combustion process control variable as a function of said relative air mass flow rate and said heat release rate; and
   controlling a primary measure for reducing the formation of thermal nitrogen oxide in the combustion process of said gas turbine using the combustion process control variable.

2. The method as claimed in claim 1, the gas turbine being equipped with at least one variable inlet guide vane, wherein the reference air mass flow rate is defined at a reference variable inlet guide vane position, the step of determining the relative air mass flow rate further including determining the relative air mass flow rate as a function of the actual position of the at least one variable inlet guide vane.

3. The method as claimed in claim 1, the gas turbine being equipped with premix burners for reducing thermal nitrogen oxide formation, wherein the distribution of a fuel quantity to individual burners or burner groups is controlled as a function of the combustion process control variable.

4. The method as claimed in claim 1, wherein individual burners are started and shut down as a function of the combustion process control variable.

5. The method as claimed in claim 3, the gas turbine being equipped with a group of diffusion burners, wherein the diffusion burners are started and shut down as a function of the combustion process control variable.

6. The method as claimed in claim 3, wherein an opening of fuel-control members of individual burner groups is controlled as a function of the combustion process control variable.

7. The method as claimed in claim 1, an inert medium being injected into a combustion chamber of a gas turbine in order to reduce the thermal nitrogen oxide formation, wherein the quantity of the inert medium is controlled as a function of the combustion process control variable.

8. The method as claimed in claim 7, wherein the inert medium is water.

9. The method as claimed in claim 7, wherein the inert medium is steam.

10. The method as claimed in claim 1, the gas turbine driving a generator, wherein shaft power output of the gas turbine is determined as a function of electric terminal power output of the generator.

11. The method as claimed in claim 1, wherein the rate at which heat is released from the combustion chamber of the gas turbine is determined as a function of the relative shaft power output of the gas turbine and the combustion-chamber pressure.

12. A method of controlling primary measures for reducing the formation of thermal nitrogen oxides in the combustion process in a gas turbine, the method comprising:
   determining a relative air mass flow rate through the gas turbine as related to a reference air mass flow rate at a reference ambient air temperature, ambient air pressure, ambient air humidity, inlet guide van position, and compressor inlet temperature, as a function of at least one of actual ambient air temperature, ambient air pressure, ambient air humidity, inlet guide vane position, and compressor inlet temperature;
   determining relative shaft power output as related to a reference shaft power output at an output shaft of said gas turbine;
   determining a relative thermal power as a function of said relative shaft power output;
   calculating a combustion process control variable as a function of said relative air mass flow rate and said relative thermal power; and
   controlling a primary measure for reducing the formation of thermal nitrogen oxide in the combustion process of said gas turbine using the combustion process control variable, wherein the combustion process control variable (SPRR), is calculated from the formula:

$$SPRR = (P_{act}/m_{air})/(1-\Pi^A)$$

in which formula
   $P_{act}$ = the relative shaft power output of the gas turbine,
   $m_{air}$ = the relative air mass flow rate through the gas turbine engine, Π=the ratio of the combustion-chamber pressure to the ambient pressure, and A=an exponent determined partly empirically by measuring nitrogen oxide emissions of the gas turbine at various shaft power outputs of the gas turbine.

13. The method as claimed in claim 12, the gas turbine being equipped with at least one variable inlet guide vane, wherein the reference air mass flow rate is defined at a reference variable inlet guide vane position, the step of determining the relative air mass flow rate further including determining the relative air mass flow rate as a function of the actual position of the at least one variable inlet guide vane.

14. The method as claimed in claim 12, wherein shaft power output of the gas turbine is calculated as a function of a terminal power output of a generator driven by the gas turbine.

15. The method as claimed in claim 12, wherein the exponent A=1.

16. A method of controlling the formation of thermal nitrogen oxides in the combustion process in a gas turbine, the method comprising:

determining a relative air mass flow rate through the gas turbine as related to a reference air mass flow rate at a reference ambient air temperature, ambient air pressure, ambient air humidity, and compressor inlet temperature, as a function of at least one of actual ambient air temperature, ambient air pressure, ambient air humidity, inlet guide vane position, and compressor inlet temperature;

determining relative shaft power output as related to a reference shaft power output at an output shaft of said gas turbine;

determining a heat release rate as a function of said relative shaft power output;

calculating a combustion process control variable as a function of said relative air mass flow rate and said heat release rate;

selecting at least one control parameter of the combustion process, which control parameter directly effects the formation of thermal nitrogen oxides in the combustion process, from the group consisting of:
      the ratio of the rates of addition of fuel to at least two burners or burner groups;
      the rate of addition of inert material to the combustion process;
      the rate of addition of air to the combustion process; and
      combinations thereof; and controlling the at least one control parameter of said gas turbine using the combustion process control variable to reduce the formation of thermal nitrogen oxide in the combustion process.

* * * * *